United States Patent
Li et al.

(10) Patent No.: US 11,244,673 B2
(45) Date of Patent: Feb. 8, 2022

(54) STREAMING CONTEXTUAL UNIDIRECTIONAL MODELS

(71) Applicant: MICROSOFT TECHNOLOGY LICENSING, LLC, Redmond, WA (US)

(72) Inventors: Jinyu Li, Redmond, WA (US); Amit Kumar Agarwal, Redmond, WA (US); Yifan Gong, Sammamish, WA (US); Harini Kesavamoorthy, Bengaluru (IN); Changliang Liu, Bellevue, WA (US); Liang Lu, Remond, WA (US)

(73) Assignee: MICROSOFT TECHNOLOGLY LICENSING, LLC, Redmond, WA (US)

(*) Notice: Subject to any disclaimer, the term of this patent is extended or adjusted under 35 U.S.C. 154(b) by 159 days.

(21) Appl. No.: 16/516,849

(22) Filed: Jul. 19, 2019

(65) Prior Publication Data
US 2021/0020166 A1   Jan. 21, 2021

(51) Int. Cl.
G10L 15/16       (2006.01)
G10L 15/14       (2006.01)
G06F 40/149      (2020.01)
G06N 3/04        (2006.01)

(52) U.S. Cl.
CPC .......... *G10L 15/142* (2013.01); *G06F 40/149* (2020.01); *G06N 3/049* (2013.01); *G10L 15/16* (2013.01)

(58) Field of Classification Search
CPC ......... G06N 3/049; G06N 3/08; G06N 3/0445

USPC ................................ 704/231–257, 270–275
See application file for complete search history.

(56) References Cited

U.S. PATENT DOCUMENTS

| | | | |
|---|---|---|---|
| 2017/0148433 A1 | 5/2017 | Catanzaro et al. | |
| 2018/0137349 A1* | 5/2018 | Such ........................ | G06N 3/08 |
| 2018/0165572 A1* | 6/2018 | Yoo ....................... | G06N 3/0445 |
| 2020/0020322 A1* | 1/2020 | Guevara .............. | G06N 3/0445 |

OTHER PUBLICATIONS

Rao et al. "Exploring Architectures, Data, and Units for Streaming End-to-End Speech Recognition with RNN-Transducer", in Proc. ASRU 2017 (Year: 2017).*
Sak et al. "Recurrent Neural Aligner: An Encoder-Decoder Neural Network Model for Sequence to Sequence Mapping". Interspeech 2017, Aug. 20-24 (Year: 2017).*
He et al. "Streaming End-to-End Speech Recognition for Mobile Devices". ICASSP 2019, May 12-May 17, 2019 (Year: 2019).*

(Continued)

*Primary Examiner* — Jesse S Pullias
(74) *Attorney, Agent, or Firm* — Workman Nydegger

(57) ABSTRACT

Streaming machine learning unidirectional models is facilitated by the use of embedding vectors. Processing blocks in the models apply embedding vectors as input. The embedding vectors utilize context of future data (e.g., data that is temporally offset into the future within a data stream) to improve the accuracy of the outputs generated by the processing blocks. The embedding vectors cause a temporal shift between the outputs of the processing blocks and the inputs to which the outputs correspond. This temporal shift enables the processing blocks to apply the embedding vector inputs from processing blocks that are associated with future data.

20 Claims, 9 Drawing Sheets

(56) References Cited

OTHER PUBLICATIONS

Moritz et al. "Triggered Attention for End-to-End Speech Recognition". ICASSP 2019, May 12-May 17, 2019 (Year: 2019).*
Li et al. "Improving Layer Trajectory LSTM with Future Context Frames". ICASSP, May 12-17, 2019, Brighton, UK, pp. 6550-6554 (Year: 2019).*
Li, et al., "Improving Layer Trajectory LSTM with Future Context Frames", In Proceedings of the IEEE International Conference on Acoustics, Speech and Signal Processing, May 12, 2019, pp. 6550-6554.
Li, et al., "Layer Trajectory LSTM", In Repository arXiv, arXiv:1808.09522, Aug. 28, 2018, 5 Pages.
Li, et al., "Exploring Layer Trajectory LSTM with Depth Processing Units and Attention", In Proceedings of the IEEE Spoken Language Technology Workshop, Dec. 18, 2018, pp. 456-462.
"International Search Report and the Written Opinion Issued in PCT Application No. PCT/US2020/036820", dated Oct. 7, 2020, 32 Pages.
Wang, et al., "Lookahead Convolution Layer for Unidirectional Recurrent Neural Networks", In Proceedings of the International Conference on Learning Representations, May 2, 2016, 4 Pages.

\* cited by examiner

STREAMING CONTEXTUAL UNIDIRECTIONAL MODELS

BACKGROUND

Speech recognition technologies have greatly benefited from advances in computers. For instance, it is now possible to provide a computer with an audio file and to convert that audio into speech. However, despite current advances in computers, there is still room to improve the manner in which the speech recognition is performed by computers to reduce errors and delays in the process.

One new advance in speech recognition that is enabled by computing systems is machine learning. Machine learning models utilize complex mathematical algorithms in processing blocks that receive input that is fed into the mathematical algorithms to generate a predicted output. Machine learning models are configured to be trained (e.g., to learn) from the processing that is performed on earlier data sets, to identify patterns and to continually reinforce accurate analysis and to make changes when the analysis is incorrect.

Once a model is trained, it can be used to make predictions on the new input data based on the patterns and historical analysis of past predictions that were found to be accurate or inaccurate during the training. In this manner, machine learning systems are enabled to make data driven predictions that are often more accurate than predictions that would otherwise be based on simple static program instructions. Because of this, machine learning models have been shown to have promising results for improving the speed and accuracy of performing speech recognition, as compared to static analysis tools.

It has also been found that the accuracy of a model can sometimes be improved by creating dependencies between different processing nodes in the model, such as with recurrent neural networks (RNNs) and deep neural networks (DNNs).

In RNNs, the processing blocks or nodes of the model form a temporal sequence (e.g., directed graph) in which the processing blocks in the model rely on and/or incorporate information that is output from temporally preceding blocks (unidirectional RNN) and/or a combination of preceding and subsequent blocks (bidirectional RNN). The bidirectional RNN models provide more context and information for each processing block, such that they are typically more accurate than the unidirectional models.

However, the unidirectional models can be applied to streaming data, whereas bidirectional models cannot. In particular, the bidirectional models incorporate dependencies that rely on output from temporally subsequent processing blocks and in which all of the data to be processed by the model must be received in its entirety before any of the blocks in the model can complete their processing. For instance, the first block in a bidirectional model cannot complete its processing until it gets the output from the second block, which cannot complete its processing until it gets the output from the third block, which cannot complete its processing until it gets the output from the fourth block, and so forth until the processing of the last block is performed with the last segment of the data being processed.

In a deep neural network (DNN), multiple hidden layers of processing blocks are hierarchically stacked or layered in an order of dependency, in which upper layers of processing blocks receive output from the processing blocks of the lower layers. In this manner, the model applies incrementally higher levels of abstraction at each layer in the model from the initial input layer to the highest output layer in the model.

Some machine learning models can also incorporate a combination of the DNN and RNN models, such that information that is output from the various processing blocks is fed sequentially forward to subsequent processing blocks in the same layers of the model (e.g., RNN processing), as well as upwards into higher layers of the model (e.g., DNN processing), to enable each processing block in the model to generate a corresponding output that is based on a rich set of contextual information. It will be appreciated that in this manner, it is possible to further increase the potential prediction accuracy of the model by providing enhanced abstractions that are based on the additional information output from the lower and earlier processing blocks.

With regard to the foregoing models, as well as other machine learning models (of which there are many types and variants), it has been found that as the model complexity increases, it also becomes increasingly more difficult to train the model. One reason for this is because of the magnitude of information that must be processed and weighed by each processing block. This results in a condition referred to as vanishing and exploding gradients, in which each processing block in the model is unable to effectively weigh and apply all of the numerous vectors of input from the lower and earlier processing blocks.

One solution for addressing vanishing and exploding gradients is a specialized processing block, called a Long Short-Term Memory (LSTM). A LSTM utilizes an input gate, output gate, and a forget gate in order to preserve information through multiple layers and through time, as well as to discard information which is no longer needed and/or that is determined to be less relevant than other data being processed by the LSTM. The LSTM processing blocks improve training of these models by eliminating the vanishing and exploding gradient issue.

For instance, it has been found that by incorporating LSTM processing blocks into an RNN (e.g., an LSTM-RNN model), it is possible to address and help solve the vanishing and exploding gradients problem. The LSTM-RNN can be used for both bidirectional models and unidirectional models. However, the LSTM has not been able to solve the problem that limits the temporal dependency problem that prevents bidirectional models from being used with streaming data. Accordingly, the unidirectional LSTM-RNN models are more broadly applicable than the bidirectional LSTM-RNN models, insomuch that the they can be applied to streaming data. However, the bidirectional LSTM-RNN models are generally more accurate than the unidirectional LSTM-RNN models, insomuch that the they incorporate greater levels of contextual information and dependencies.

It will be appreciated, therefore, that there is an ongoing need to identify new systems and methods for increasing both the accuracy and applicability of machine learning models that can be used for speech recognition and, even more particularly, which can be applied to streaming data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments generally related to methods, systems, and devices for performing and/or facilitating the processing of streaming data with machine learning models. In some instances, the disclosed embodiment can be used to help improve both the accuracy and applicability of contextual unidirectional machine learning models that are used for performing speech recognition. As disclosed herein, the referenced and claimed embodiments incorporate aspects and benefits from both unidirectional and bidirectional modelling techniques in a new and unique way.

In some embodiments, methods, systems and devices are provided for streaming contextual unidirectional models, such as, but not limited to, a contextual LSTM-RNN.

In some embodiments, a computing system performs a method of streaming contextual unidirectional machine learning models. The method includes identifying a stream of content followed by identifying frame segments within the stream of content based on a predetermined segment length. The method further includes processing of the initial frame segments before all segment frames in the stream of content have been received. The method further includes applying the segment frames into a contextual LSTM-RNN machine learning model, wherein each particular processing block in the model applies (i) the output of a processing block from the same hidden layer which is temporally aligned with a previous frame segment and (ii) the output of an embedding vector which is comprised of the outputs of processing blocks from a plurality of processing blocks on a hidden layer that is hierarchically lower than the particular processing block. The embedding vector, described in the method, comprises a plurality of processing blocks where (a) one block is temporarily aligned with the particular processing block and (b) one or more of the plurality of processing blocks correspond with segment frame(s) that are subsequent to the segment frame that corresponds to the particular processing block.

The referenced method further comprises applying a flow offset from each processing block, such that the output of each block is no longer temporally aligned with the corresponding input data of that block. Through the offset, the embedding vector applies one or more outputs from processing blocks that both (a) temporally precedes the particular processing block and (b) corresponds to frame segments which are subsequent (e.g. future frame) to the frame segment associated with the particular processing block.

In some embodiments, a computing system is used to perform the methods described herein. Likewise, in some embodiments, hardware storage devices are provided, which have stored computer-executable instructions that are executable by the processors of a computer system to implement the disclosed methods and functionality.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
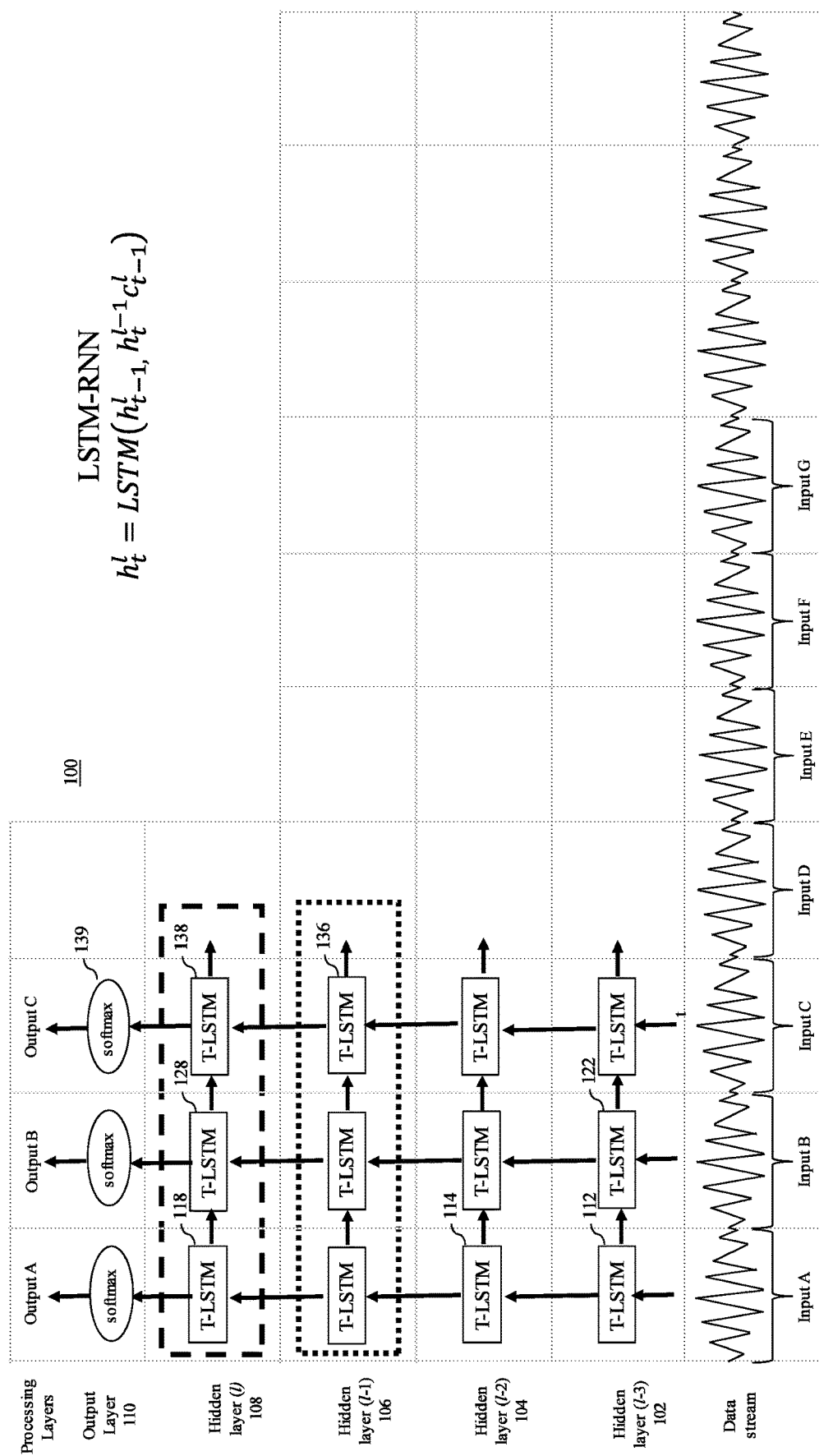
FIG. 1 illustrates an embodiment of a recurrent neural network (RNN) machine learning model which utilizes long short-term memory (LSTM) processing blocks.

The disclosed embodiments generally related to methods, systems, and devices for performing and/or facilitating the processing of streaming data with machine learning models. In some instances, the disclosed embodiment can be used to help improve both the accuracy and applicability of contextual unidirectional machine learning models that are used for performing speech recognition. As disclosed herein, the referenced and claimed embodiments incorporate aspects and benefits from both unidirectional and bidirectional modelling techniques in a new and unique way.

In some embodiments, a computing system is used to implement methods for processing a stream of data with a contextual unidirectional machine learning model. In such embodiments, the computing system identifies the data stream or stream of data to be processed. This stream of data could include speech, audio, handwritten data, text and/or other data.

In some instances, the stream of data, also referred to as a stream or data stream, contains a plurality of frame of individually identifiable segments that are identified according to a predetermined segment length that is desired for or appropriate for being processed by a machine learning model. Then, prior to receiving all frame segments within the stream of content, the computing system begins processing at least one or more of the initial frame segment(s) with a contextual LSTM-RNN machine learning model.

The machine learning model includes a plurality of processing layers of processing blocks. At least some of the processing blocks in the model apply (i) the output of a processing block from the same hidden layer which temporally precedes the particular processing block, as well as (ii) an embedding vector which is comprised of the outputs from a plurality of processing blocks on a hidden layer that is hierarchically lower in the model than the particular processing block and which incorporates context from those other processing blocks, including at least some context that is temporally offset from and particular processing block that the embedding vector is being applied to.

The disclosed embodiments can be used in many practical applications, such as speech recognition processing, with significant technical benefits, such as the ability to perform speech recognition on a stream of data with a unidirectional machine learning model. This is a significant improvement over systems that can only apply unidirectional machine learning models to complete audio files and that are unfit for streaming data. For instance, conventional unidirectional machine learning models are unavailable to convert live speech to text, because a contextual unidirectional model relies on future data to provide an output. However, the disclosed embodiments enable the application of unidirectional machine learning models to process streaming data input by applying an embedding vector within the machine learning model in such a way as to create a temporal shift in the flow of the model's processing blocks and which enables the processing of the streaming data without first receiving the entirety of the data stream. As a result, the disclosed embodiments can be used to converting speech to text in real time.

Additionally, disclosed embodiments have been found to improve the accuracy of model predictions (e.g., a reduction in error rate) by as much as 10% in some instances, over conventional speech to text machine learning models. It will be appreciated that speech to text is an important function of many modern devices and that any improvements in the accuracy of these functions has vast implications. For example, users frequently interact with computing systems, smart devices, or other inanimate objects, such as a personal digital assistant, a smart device, an automatic phone service, or even a vehicle hands-free system and so on. Accordingly, any improvement in accuracy of these systems is an important technological advance within each respective industry.

While this application will describe many embodiments in the context of a system which is configured to convert speech to text, it will be appreciated that this invention could be applied to a wide variety of technologies. For example, the input data stream of the embodiments is not limited to audible speech. In can include, for instance, any audio, handwriting, text and/or other data that can be processed by a machine learning model to make predictions of the content of that data, which may be output to a user in any number of ways and formats to accommodate different needs and preferences. The description of the embodiments in the context of speech recognition is only intended to facilitate understanding of the disclosed improvements and described functionality, not to limit the scope of the claimed embodiments.

Attention is now directed to FIG. 1, which illustrates an example of a processing flow for a machine learning model that can be used to convert speech to text. The flow shown in FIG. 1 comprises a conventional LSTM-RNN model 100.

As illustrated, segments of data to be processed are shown as Input A, Input B, Input C, and so forth. Each segment may comprise, for example, a phenome, a senone, an utterance, a phrase, a sound, a sequence of sounds, or any other identifiable portion of speech. In some instances, each segment has a length of about 10 ms and the data of each segment comprises audio that is in a digestible format for being entered as input into the processing blocks of the LSTM-RNN model 100, or that is convertible into the digestible format and that is converted into the digestible format prior to being input into the model.

As shown in FIG. 1, the data from each segment is input into the processing blocks of a processing layer of the model 100, such as initial hidden layer 102. In this layer 102 and the other layers, 104, 106 and 108, the processing blocks may comprise LSTM processing blocks, identified in model 100 as T-LSTM blocks.

For each LSTM block, the output from that LSTM block is defined by the following formulas:

$$i_t^l = \sigma(W_{ix}^l x_t^l + W_{ih}^l h_{t-1}^l + p_i^l \odot c_{t-1}^l + b_i^l) \quad (1)$$

$$f_t^l = \sigma(W_{fx}^l x_t^l + W_{fh}^l h_{t-1}^l + p_f^l \odot c_{t-1}^l + b_f^l) \quad (2)$$

$$c_t^l = f_t^l \odot c_{t-1}^l + i_t^l \odot \phi(W_{cx}^l x_t^l + W_{ch}^l h_{t-1}^l + b_c^l) \quad (3)$$

$$o_t^l = \sigma(W_{ox}^l x_t^l + W_{oh}^l h_{t-1}^l + p_o^l \odot c_t^l + b_o^l) \quad (4)$$

$$h_t^l = o_t^l \odot \phi(c_t^l) \quad (5)$$

Where t is a time step or temporal location of the LSTM block relative to the input frame/segment and l is the corresponding layer of the model where the LSTM block resides. $x_t^l$ is the input vector for the l-th layer. The vectors it, $i_t^l$, $f_t^l$, $c_t^l$, $o_t^l$, are the activation of the input, output, forget gates and memory cells. $W_x^l$ and $W_h^l$ are weight matrices and for $x_t^l$ and $h_{t-1}^l$ respectively. The $b^l$ are bias vectors and $p_i^l$, $p_f^l$, and $p_o^l$ are parameter vectors associated with peephole connections. The functions $\sigma$ and $\phi$ are the logistic sigmoid and hyperbolic tangent nonlinearity respectively (e.g., squashers). The operation $\odot$ is a hadamard product and represents element-wise multiplication vectors.

A simplified illustration of the LSTM function is as follows:

$$h_t^l = \text{LSTM}(h_{t-1}^l, h_t^{l-1}, c_{t-1}^l) \quad (6)$$

Where $h_t^l$ is the output of the LSTM processing block at time step t and layer l and $h_{t-1}^l$, $h_t^{l-1}$, $c_{t-1}^l$ are the inputs for the processing block. The input $h_{t-1}^l$ represents the output from a processing block on the same layer and a previous time step, and $h_t^{l-1}$ represents the output from a processing block on a lower layer and the same time step, and, $c_{t-1}^l$ represents the memory cells of the processing block on the same layer and a previous time step.

In the processing flow of the model 100, input A is provided as input into processing block 112. The output of this processing block 112 is then up into the processing block 114 of the next processing layer 104, at the same temporal alignment relative to the input A. This processing flow enables processing block 122 to benefit from the context of the processing block 112, which comprises one of the benefits of a RNN model.

The output from processing block 112 is also provided, within the same processing layer 102, to processing block 122, which is temporally offset from input A and which enables other processing blocks in the same layer (e.g., processing block 122) to benefit from the context of the earlier processing blocks (e.g., processing block 112). This is a benefit of unidirectional and RNN models.

Accordingly, many of the processing blocks in the model 100 will apply two inputs, for increased contextual analysis and improved accuracy. For example, consider the inputs of processing block 138, which are composed of (i) the output of the processing block 128 on the same hidden layer 108, and (ii) the output of the processing block 136 which is in a lower layer 106 from processing block 138. This process can be repeated at every hidden layer, in every processing block, and for every input segment which is fed into the model to provide the enhanced contextual analysis provided by the RNN unidirectional model shown.

Notably, at a final layer 110 of the model 100, output is generated/provided, such as through softmax processing blocks 139, in the desired output format (e.g., Output A, Output B, Output C, and so forth), which correspond to the initial inputs (e.g., Input A, Input B, Input C, and so forth). In some instances, the softmax layer 139 provides the outputs as final posterior vectors, which can be used to perform a final senone classification based on probabilities for identifying the predicted text (output) of the initial speech (input). These outputs are final predictions that result from the machine learning processing that has been applied to the initial inputs. Notably, the accuracy of the predictions can be improved by using the context from earlier inputs and outputs that are considered at each processing block, as described. This is a benefit of RNN models and unidirectional models. However, there is still room for improvement, such as by incorporating additional context.

For instance, the machine learning model 100 described in FIG. 1 has limited temporal modeling power because information is fed in only one direction at each layer. As a result, each processing block relies solely on past information. This limited modeling power limits the accuracy of this type of model relative to bidirectional models, for example. However, because this model is unidirectional, it has increased applicability because it is available for a streaming data input.

Figure 2:
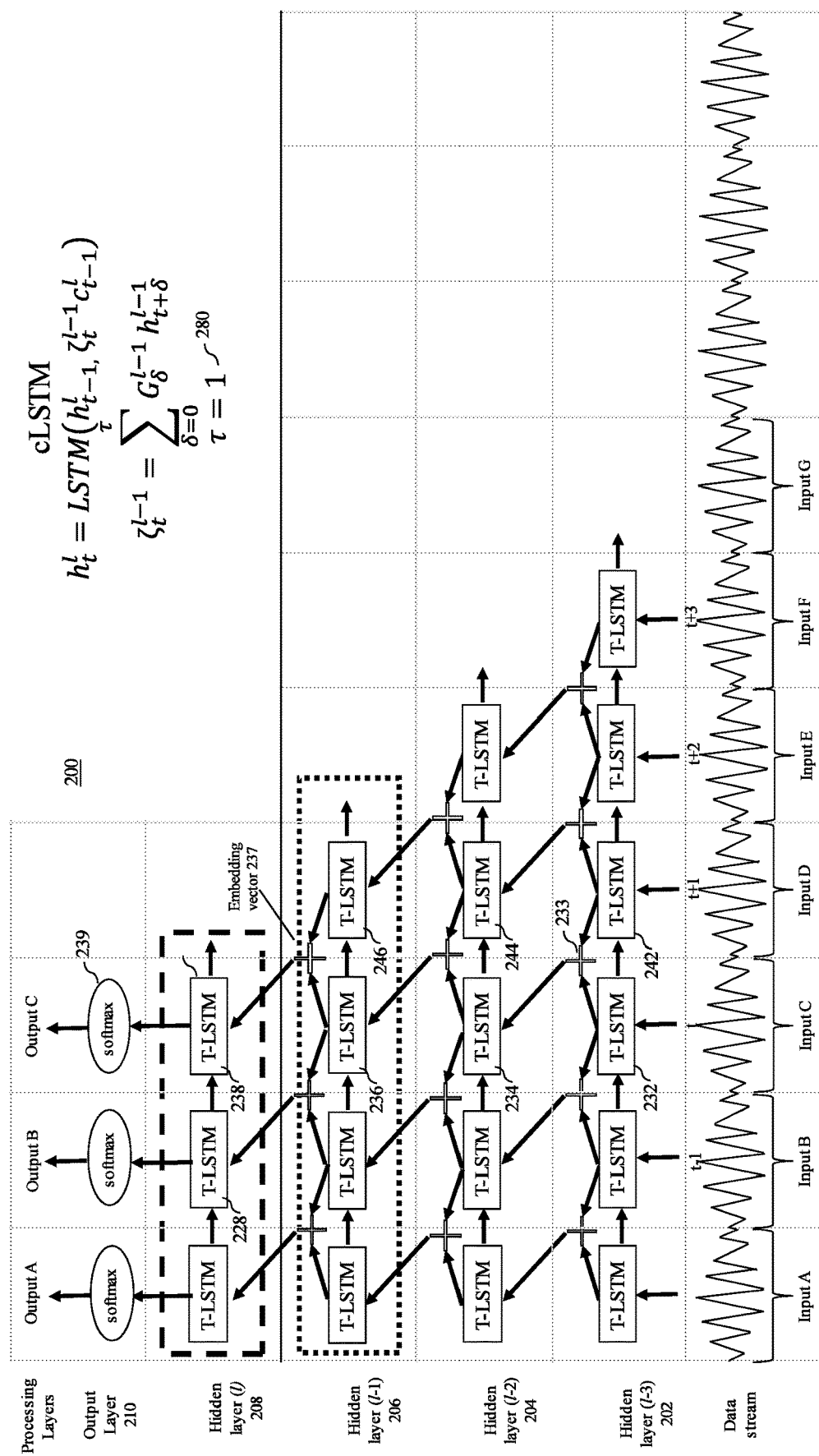
FIG. 2 illustrates an embodiment of a contextual unidirectional machine learning model which utilizes future frames to improve output accuracy.

FIG. 2 illustrates an embodiment of a contextual unidirectional model 200 which incorporates some additional context during processing that is not considered in the embodiment of FIG. 1. In particular, the contextual unidirectional model 200 shown in FIG. 2 combines some principles of a bidirectional model, by using some future information to increase accuracy, as well as utilizing aspects of a unidirectional model, by applying rules of the processing in only one direction of flow.

This contextual unidirectional model 200 has increased accuracy over the unidirectional model 100, because it allows some access to future information. However, it is still somewhat limited, insomuch that it requires the entire stream of content to be received before processing can begin, since each processing block in the processing layers (other than the initial layer) relies on output from at least one earlier processing block, but those blocks may not be received at the time the processing is to occur and create an error in the system. This will be described in more detail below.

As shown in FIG. 2, the processing blocks of the model 200 also utilize LSTM processing algorithms, such as those described in FIG. 1.

The model 200 operates as follows, a data stream is first segmented into segment frames as Input A, B, and C and digested into a compatible format and fed into the corresponding input blocks of the input layer 202. For instance, the data from a segment frame, Input C, is fed into processing block 232 of the initial hidden layer 202 of the model, which is temporally aligned with that input segment.

Then, the output of processing block 232 is fed forward to the temporally subsequent processing block 242 within the same layer. The output of the processing block 232 is also combined with the output of other processing blocks into an embedding vector 233. The embedding vector includes output of processing blocks which are associated with future frame segments (e.g., input segment t+1, comprising input D). The embedding vector 233 is then applied to processing block 234. In this manner, processing block 234, which is associated with Input C, has access to future frames because it applied information from the embedding vector 233, which was composed of output data, including data from processing block 242, which was originally derived from Input D which is a future frame of Input C.

Each processing block in the contextual machine learning model 200 applies two inputs (except for the processing blocks associated with the initial segment frame Input A). For example, a particular processing block 238 applies as inputs, (i) the output of a processing block 228 within the same hidden layer 208 but which is temporally previous to the particular processing block and (ii) the embedding vector 237 which is comprised of (a) the output of processing block 236 which temporally aligns with the particular processing block 238, but which is located on a hierarchically lower layer 206 of the model 200, and (b) the output of processing block 246 which is temporally subsequent to the particular processing block 238 and which is also located on the hierarchically lower layer 206.

Notably, because the particular processing block 238 is in the final hidden layer 208, the output of the processing block 238 is applied to the softmax output layer 239 for a final senone classification, as described in reference to the output layer of model FIG. 1. Also, like model 1, the output of each output block in the final layer corresponds directly to and is temporally aligned with the same input segment. For instance, Output C (from output block 239) is temporally aligned with the frame/segment of Input C. This can cause problems with real-time streaming in some instances if the system wants to provide the output for each segment as the input is received and as it thinks it can. For instance, the system may think it can generate Output C from the model, after having received the temporally aligned Input C. However, it can't, and processing of the model can crash, because the Output C actually can't be generated until Input D, Input E and Input F are received, as shown by the flow of FIG. 2.

One reason for this is that the function of the LSTM in the contextual unidirectional model 200 requires context from lookahead frames, as defined by the following formulas.

$$h_t^l = \text{LSTM}(h_{t-1}^l, \zeta_t^{l-1}, c_{t-1}^l) \quad (7)$$

$$\zeta_t^{l-1} = \Sigma_{\delta=0}^\tau G_\delta^{l-1} h_{t+\delta}^{l-1} \quad (8)$$

Notably, the biggest change between formula (6) for model 100 and formula (7) for model 200 is the replacement of the $h_t^{l-1}$ input with the embedding vector $\zeta_t^{l-1}$ where $G_\delta^{l-1}$ is a weight vector and $h_{t+\alpha}^{l-1}$ is the output of a lower level processing block at the time step $\delta$ where $\delta$ is between 0 and $\tau$, and $\tau$ is the number of lookahead frames.

In this model 200, the lookahead frame 280 is beneficial context added to the embedding vector, which means that the embedding vector comprises information from one future processing block. This can be beneficial, particularly when applied to an audio file. However, it can cause the system to crash if the system tries to process the output of a final processing block in the model that is temporally aligned with the corresponding input frame/segment.

One solution to this problem would be to force a delay in the processing of an output block until a predetermined quantity of input segments have been received. This delay may be explicitly forced by various programming routines.

In some embodiments, the delay is incorporated into the embedding vector directly and which results in a temporal offset of the processing block output from the corresponding input (as shown and as described below with reference to FIG. 3A-D). By doing this, it is possible to address and overcome possible limitations with regard to the model described in FIG. 2 and which can facilitate the application of unidirectional models (e.g., LSTM RNN models or others) for performing speech recognition on streaming data.

The model 300, shown in FIGS. 3A-3D illustrates a plurality of stages of flow for processing layers 302, 304, 306, 308 and 310 of a streaming contextual unidirectional model, which is a model that can be applied to process a stream of data in near real-time, without running into some of the problems described above in reference to the model 200 of FIG. 2, but which still realizes the benefits of enhanced analysis provided by having processing blocks rely on context of future frames/processing blocks in the model.

As shown, as a stream of content is received, it can be segmented into a plurality of segments, wherein each segment has corresponding input from the stream (e.g., Inputs A, B, C, and D). When the input is received/identified, it is converted into a compatible format such as, but not limited to, a bit bank, register, or vector. The input is then applied into processing blocks of the first hidden layer 302 of the model 300.

In the first processing layer, also referred to as a hidden layer 302, the processing blocks 312, 322, and 332 receive input values from the data stream segments. Additionally, each of these processing blocks (except for the processing block 312 associated with the first segment frame) will receive input from a temporally preceding block. Accordingly, each of the processing blocks in this initial processing layer 302 have two inputs, which include (i) the outputs of a temporally preceding processing block on the same hidden layer 302, and (ii) the speech spectrum input from the data stream, which is temporally aligned with the particular processing block. For example, a particular processing block 332 (corresponding to a temporal time t) applies output from a temporally preceding processing block 322 (at time t−1) on the same processing layer, in addition to the speech spectrum input (e.g., Input C) that is obtained from a data stream segment that is temporally aligned with the segment of that particular processing block (e.g., both segments/frames for Input C and block 332 are temporally aligned to time t).

Figure 3A:
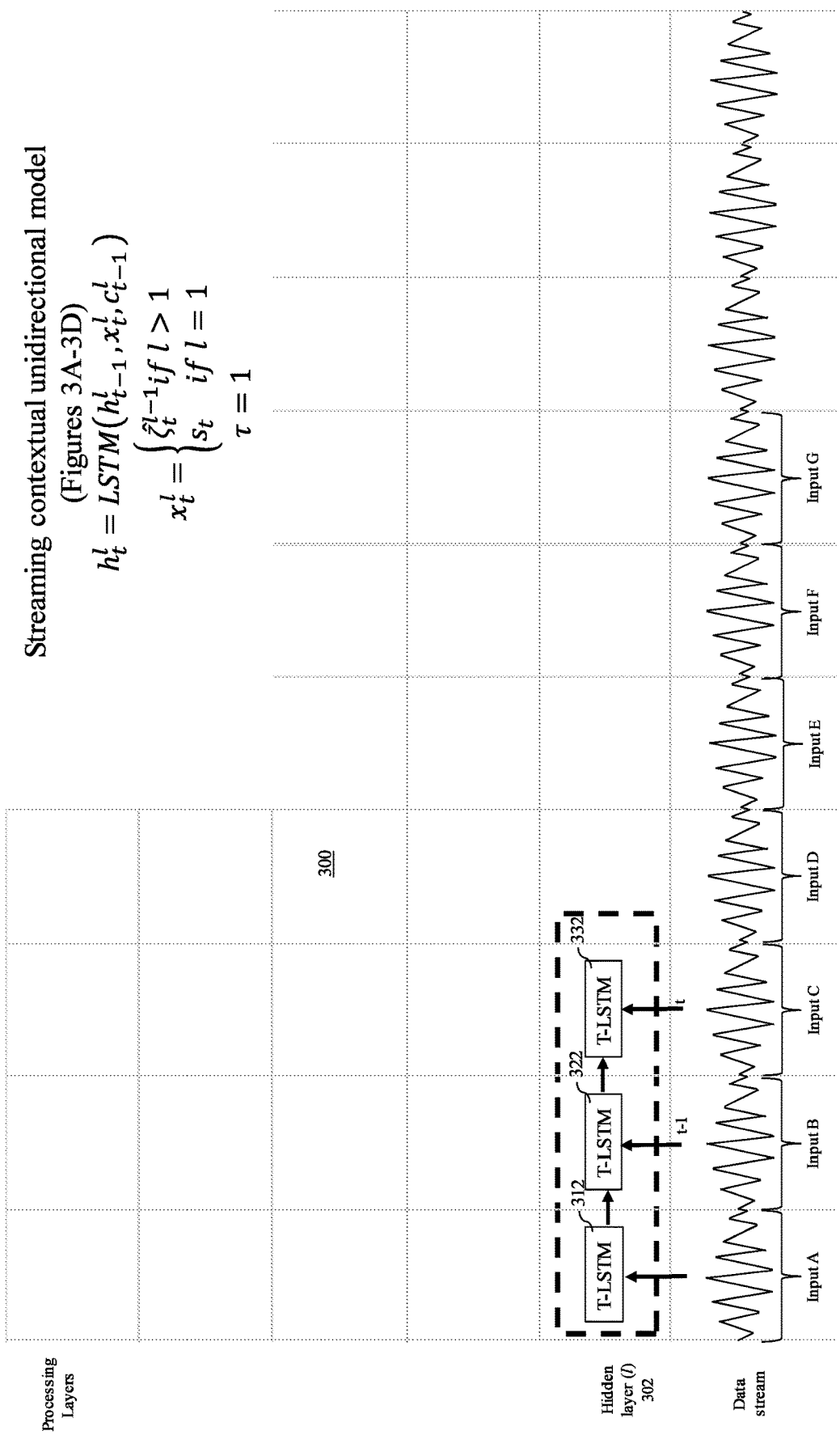
FIG. 3A-3D illustrate embodiments of processing layers of a streaming contextual unidirectional machine learning model.
Figure 3B:
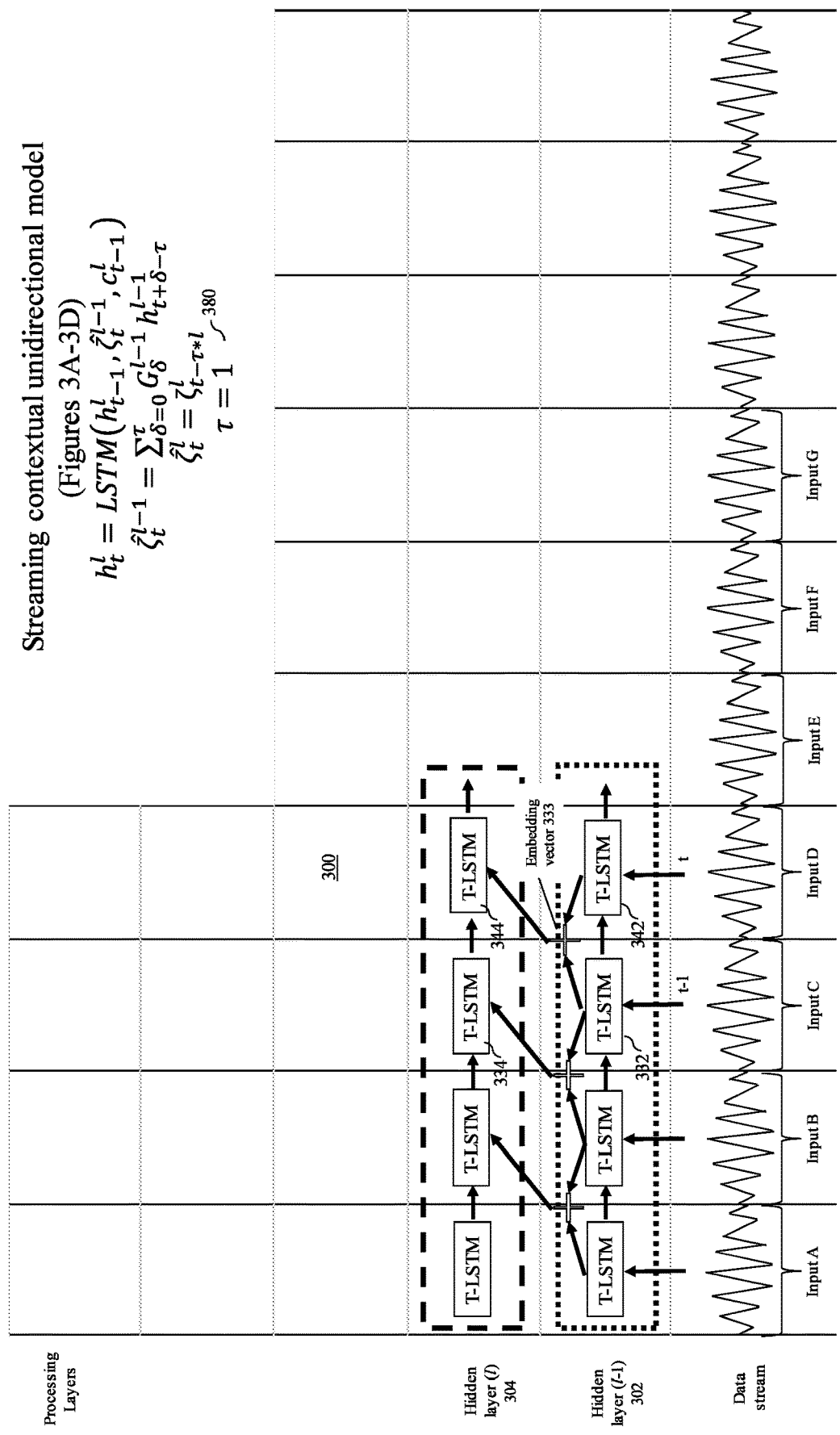

FIG. 3B illustrates another processing layer of the model 300, this layer is currently referred to as a second hidden later 304 in the model 300. In layer 302, the processing blocks, such as processing block 344, are also configured apply/process at least two inputs. (One of the inputs may be an output from a temporally aligned processing block in a lower layer, which is a trait of RNN models, although it is not presently illustrated for simplicity and clarity of the other issues that are addressed with the Figures. This is true for the entire model (and other related models) which also receive input from a temporally aligned lower level block, although this is not explicitly shown in FIGS. 2, 3C-3D and 4).

Figure 3C:
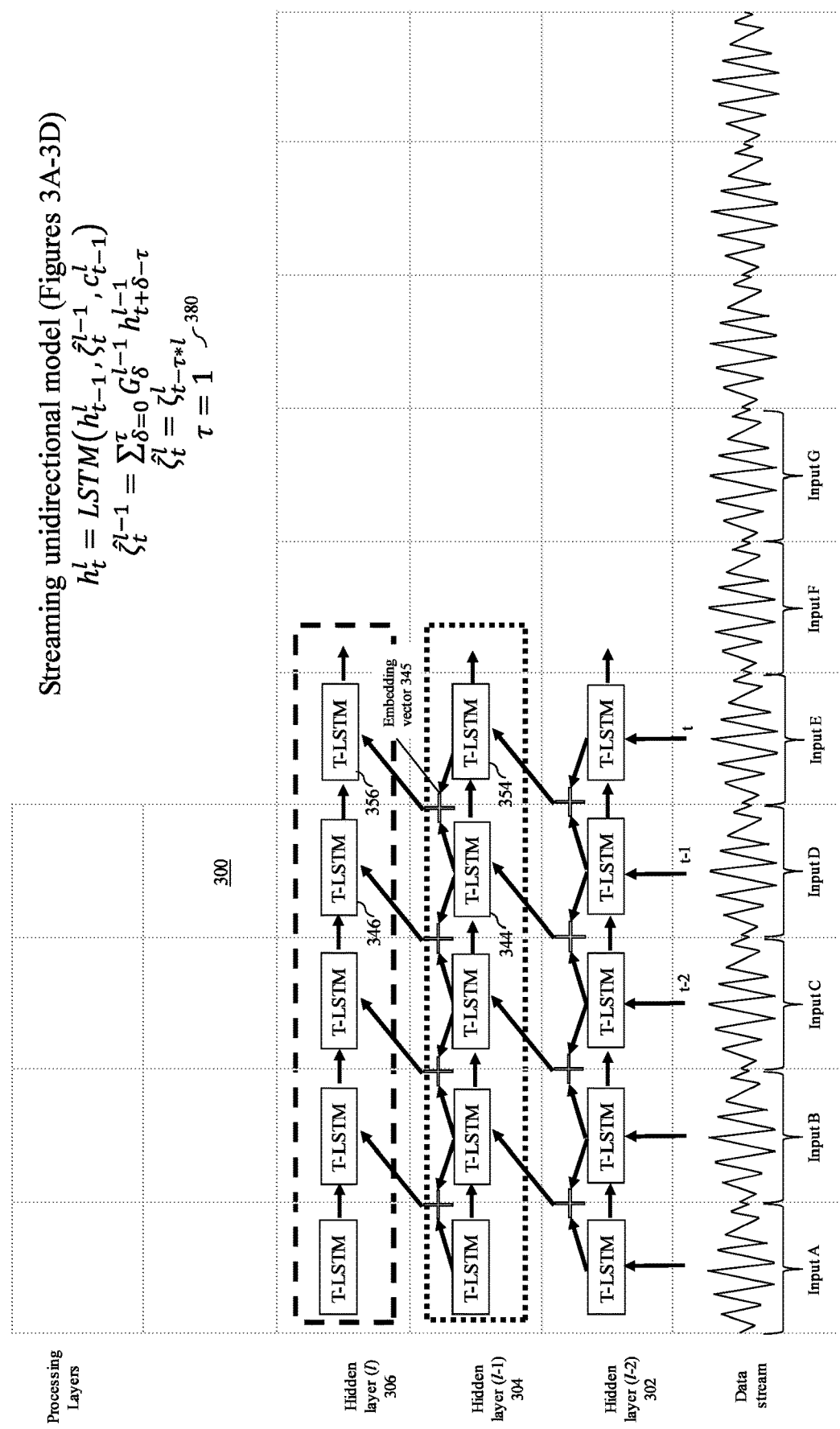
Figure 4:
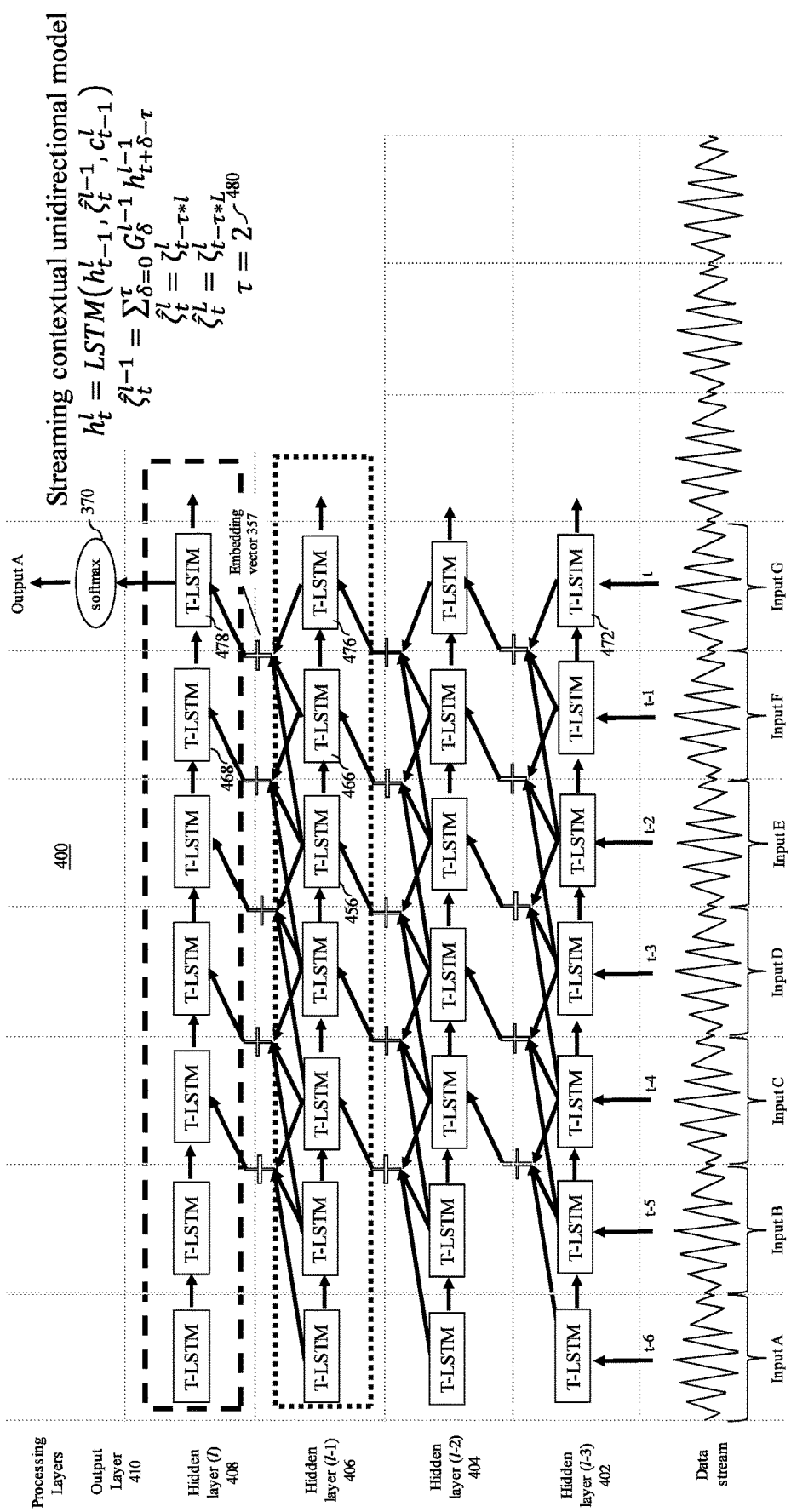
FIG. 4 illustrates another embodiment of a streaming contextual unidirectional machine learning model, which applies a process flow shift that is greater than a shift that is shown in FIGS. 3A-3D.

The illustrations of FIGS. 3B-3C and 4 have been specifically provided to highlight a specialized type of inputs that is applied/processed by the processing blocks in the model (other than in the initial layer). This specialized type of input is an embedding vector that is configured to apply context from at least one processing block that is temporally offset in a lower level of the model and which is applied in such a way as to create a temporal shift or offset in the outputs of the model from the inputs that they correspond to. This offset is beneficial for enabling streaming applications and will be described in more detail below.

As shown in FIG. 3B, for instance, processing block 344 applies/processes input composed of the output of processing block 334, which is on the same hidden layer 304 as the particular processing block 344, but which temporally precedes processing block 344, as well as the embedding vector 333, which is configured to create the temporal shift in the output of the processing block 344 from the input (Input C) it directly corresponds to.

The embedding vector 333, comprises a combination of outputs from a plurality of processing blocks (e.g., blocks 332 and 342) in a lower processing layer of the model 300 (e.g., layer 302) than the layer of the particular processing block (e.g., block 344 in layer 304) that is incorporating/processing the embedding vector as input.

The embedding vector may include, for example, output from processing block (e.g., block 332) which is temporally aligned with a corresponding frame segment (e.g., a segment at t−1 from block 344) that occurs prior to a frame segment (e.g., segment at time t) that is temporally aligned with the particular processing block (e.g., block 344).

The embedding vector may also include, as shown, output from a processing block, such as block 342, which is on the next lower processing layer (e.g., layer 302) but which is temporally aligned with the particular processing block. For instance, block 342 is temporally aligned with block 344 at time t.

In this instance, an effect of the embedding vector 333 is that it creates a temporal offset between the particular processing block (e.g., block 344) that is incorporating the embedding vector as input by at least one frame/segment length from the actual input segment that it corresponds to.

For instance, processing block 344 is temporally aligned with the segment at time t, which is temporally aligned with Input D. But, processing block 344 (or at least its output) has been temporally offset, due to the processing of the embedding vector 333, such that the output of processing block 344 actually corresponds to Input C. This offset comprises a temporal offset of at least one segment (e.g., Input C segment is temporally offset t−1 from the temporal alignment of processing block 344).

This temporal shift is intentional, desirable and beneficial, because this temporal shift enables the model/system to automatically refrain from processing blocks in the model until they are actually ready to be processed with all of the information they need to perform the processing. For instance, by applying a temporal shift with the embedding vector in this manner, each processing block in the model can access future frame segments without a need to apply processing blocks which are temporally aligned with future segments.

By way of example, a particular processing block in the model (e.g., block 344) can be configured to apply an embedding vector (e.g., embedding vector 333), which is comprised of the outputs from the processing blocks on a lower layer (e.g., blocks 332 and 342), including at least one block (e.g., 342) that is temporally offset from a temporal alignment of the particular processing block (e.g., block 342 is offset t−1 from the temporal alignment t of block 344).

This configuration ensures that each of the processing blocks incorporated into the embedding vector (e.g., blocks 332 and 342) are available for input as part of the embedding vector that is provided to the particular processing block (e.g., block 344) at a given instance the block is processed, because they are either temporally aligned with that particular processing block (e.g., aligned with time t of processing block 344), or they are temporally aligned with an earlier time (e.g., a segment having a temporal alignment of t−1, t−2 or earlier, relative to the particular processing block).

This offset caused by the embedding vector translates future segment frames into historical processing blocks, such that the information that is required by each processing block is available to the particular processing block in a streaming situation. The magnitude of the offset caused by the embedding vector in a particular layer is a product of the context of future frames that are used by the embedding vector. This context is defined as the quantity of lookahead frames/segments (e.g., lookahead value 380) that are utilized by the embedding vector, as will be described in more detail below.

The magnitude of the temporal shift that is applied to a model by the embedding vector will also depend on the quantity of layers in the model that utilize the embedding vector, inasmuch as each layer in the model can cause a separate temporal shift when applying the embedding vector at each layer. This is illustrated by the examples shown in FIGS. 3C and 3D.

As shown in FIG. 3C, the next processing layer of the model 300 (e.g., second hidden layer 304) applies another temporal offset by utilizing an embedding vector (e.g. embedding vector 345), which is similar to embedding vector 333, and which is also configured to apply context from processing blocks of a lower layer, including at least one block that is temporally offset from the processing block that uses the embedding vector.

For instance, the embedding vector 345 is provided as input to processing block 356, which is temporally aligned with Input E at a time t relative to the segment of processing block 356. But processing block 356 and its output is temporally offset from the segment of input to which block 356 corresponds. In particular, block 344 generates output that comprises input for the embedding vector 345 and processing block 356. However, block 344 is in a segment having a temporal alignment of t−1 relative to the alignment t of the processing block 356 that utilizes the embedding vector 345. Notably, block 356 also corresponds to the Input C and is now even further offset from the temporal alignment of the segment for Input C. Now, for instance, the segment of Input C is at t−2 from the temporal alignment t of block 356. This offset of 2 temporal segments between the output of block 356 and the Input C is due to two different layers in the model (e.g., layers 304 and 306) each applying embedding vectors (e.g., embedding vectors 333 and 345) that each incorporate a lookahead value of 1 temporal segment.

Figure 3D:
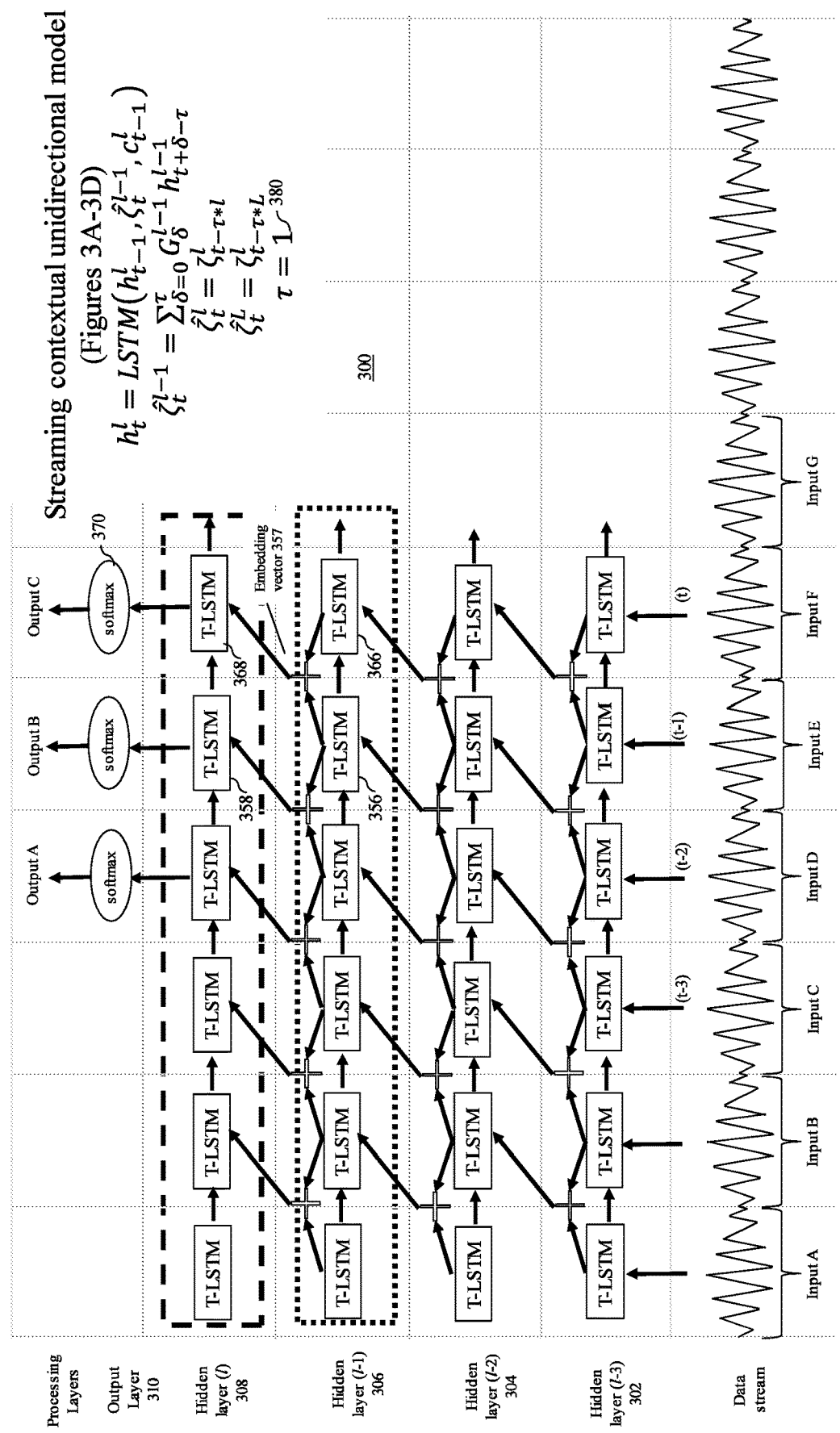

FIG. 3D illustrates yet another example of utilizing an embedding vector having a lookahead value of 1 for applying the context from processing blocks that are temporally offset and in the future from an input stream segment, to improve accuracy of the model in predicting output associated with the input segment, but which creates a temporal offset within the model so that the model can process the input in a streaming application.

As shown, layer 308 includes a particular processing block 368 that corresponds to Input C and that is temporally offset from the alignment of the segment for Input C by three temporal segments. The output from block 368 is provided to a softmax processing block 370, which generates Output C. This output can comprise a posterior vector, or other output, which can be translated into the final output of the model. For example, in speech recognition, the posterior vector would be used for senone classification to make prediction of the speech data stream in textual format.

Block 368 generates the output from at least the following two inputs: (i) the output from the processing block 358, which is located on the same hidden layer 308 as the particular processing block 368, but which temporally precedes the particular processing block 368, as well as (ii) an embedding vector 357.

As with the other embedding vectors 333 and 345, embedding vector 357 is comprised of outputs from processing blocks of an immediately lower layer in the model (e.g., blocks 356 and 366 in layer 306), of which at least one processing block (e.g., block 356) is temporally offset from (and which temporally precedes) the temporal alignment of the processing block 368 that utilizes the embedding vector 357.

The embedding vector 357 also includes output from the processing block 366 that is temporally aligned with the particular processing block 368. It will be appreciated that processing blocks 356, 358 and 366 utilize different combinations of output(s) from the other processing blocks in the model 300, which are based on Inputs A-F. Therefore, the particular processing block 368 has access to segment frames A-F for improved modeling power when generating the predictive output used to generate Output C corresponding to Input C. Even more particularly, as shown, Output C is ultimately based on context from various inputs other than Input C, including Input A and Input B, which preceded Input C, as well as the context from Input D, Input E and Input F, which followed (or which are in the future relative to Input C).

In this manner, the model 300 has the ability to improve accuracy of the predictive outputs generated by the model, similar to the benefits provided by bi-directional models, by considering/applying increased context from other segments/blocks, even those that are in the future. But, unlike conventional bidirectional models, and even some unidirectional models, which cannot be used in streaming applications, the disclosed embodiments can be used in streaming applications by using unique embedding vectors that are applied in such a way by the models to create temporal offsets that ensure the processing blocks in the model have the data they need when they perform their processing.

Said in another way, the temporal shift caused by the embedding vectors in the disclosed embodiments can be beneficial for enabling streaming applications, while still enabling the processing blocks of the model to incorporate and benefit from the context of future frames.

It has been found in some instances, the application of context from future frames can improve accuracy of the model (in some instances by 10% or more) and the current embodiments are able to process it in such a way that the computing system applying the model will not attempt to generate output for an output block that it does not already have the necessary inputs for, thereby enabling the application to streaming data.

To provide additional clarity, a few formulas relating to the LSTM processing blocks and embedding vectors used by the model 300 will now be provided. For instance, the function of an LSTM in a streaming contextual unidirectional model can be defined by the following:

$$h_t^l = \text{LSTM}(h_{t-1}^l, \hat{\xi}_t^{l-1}, c_{t-1}^l) \tag{9}$$

$$\hat{\xi}_t^{l-1} = \Sigma_{\delta=0}^\tau G_\delta^{l-1} h_{t+\delta-\tau}^{l-1} \tag{10}$$

$$\hat{\xi}_t^l = \xi_{t-\tau*l}^l \tag{11}$$

$$\hat{\xi}_t^L = \xi_{t-\tau*L}^l \tag{12}$$

Where $\hat{\xi}_t^l$ is the embedding vector after the output shift has been applied to each hidden layer, as described above. The biggest difference between the formula (7) and formula (9) is the replacement of the standard embedding vector $\xi_t^{l-1}$ with the embedding vector after the output shift has been applied $\hat{\xi}_t^{l-1}$.

It will be noted that in FIGS. 3A through 3D, the exemplarily model 300 was composed of only four hidden layers 302, 304, 306, 308 and the embedding vectors only used a lookahead value of 1. However, the scope of the invention is not limited to any particular quantity of layers in a model, nor the lookahead frame 380 value used by the embedding vectors in the model. Instead, any number of layers may be used in the model and the embedding vectors may use any desired number of lookahead frames. That said, it will be appreciated, with regard to the temporal shift created by the embedding vector, the total magnitude of the overall temporal shift/offset that is realized by a model will be a product of the total quantity of layers in the model and the lookahead value that is set for the embedding vector.

By way of example, FIG. 4 illustrates a machine learning model 400 which utilizes an embedding vector 357 that applies a value of 2 lookahead frames 480. In order to facilitate the increased lookahead frames, the offset at each hidden layer, starting with the second hidden layer, must also be increased to ensure that all applicable processing blocks will be either temporally aligned with a particular processing block 478 or temporally previous to a particular processing block 478.

In this example, a particular processing block 478 and its output (Output A or output used by a softmax block 370 to generate Output A) corresponds to the frame segment of Input A, which is temporally offset from the block 478 by a shift of six temporal segments (e.g., t–6 relative to the temporal alignment t of the segment for block 478).

The processing block 478 generates its output from at least the following inputs: (i) the output from the processing block 468 which is located on the same hidden layer 408 as the particular processing block 478, but which temporally precedes block 478, and (ii) an embedding vector 467 comprised of outputs from processing blocks 456, 466, 467, which are located on a lower layer 406 to the particular processing block 478, with at least one being temporally offset from the alignment of the processing block 478. For instance, processing blocks 456 and 466 both temporally precede processing 478 block. The other input shown for the embedding vector, processing block 476, is temporally aligned with processing block 478.

It will be appreciated that while processing block 478 corresponds to the first input segment, Input A, the inputs used by block 478 are a result of information/context that is fed up through the model to processing block 478, from Inputs A-G, including a total of six future frame segments. Thus, the temporal modeling power of the machine learning model 400 in FIG. 4 could potentially provide increased accuracy, based on additional context, when compared to the model 300 which generated output from the context of three future frames. This results from utilizing a lookahead value of 2, rather than 1, for the embedding vector. Other values can also be used, as described earlier.

Figure 5:
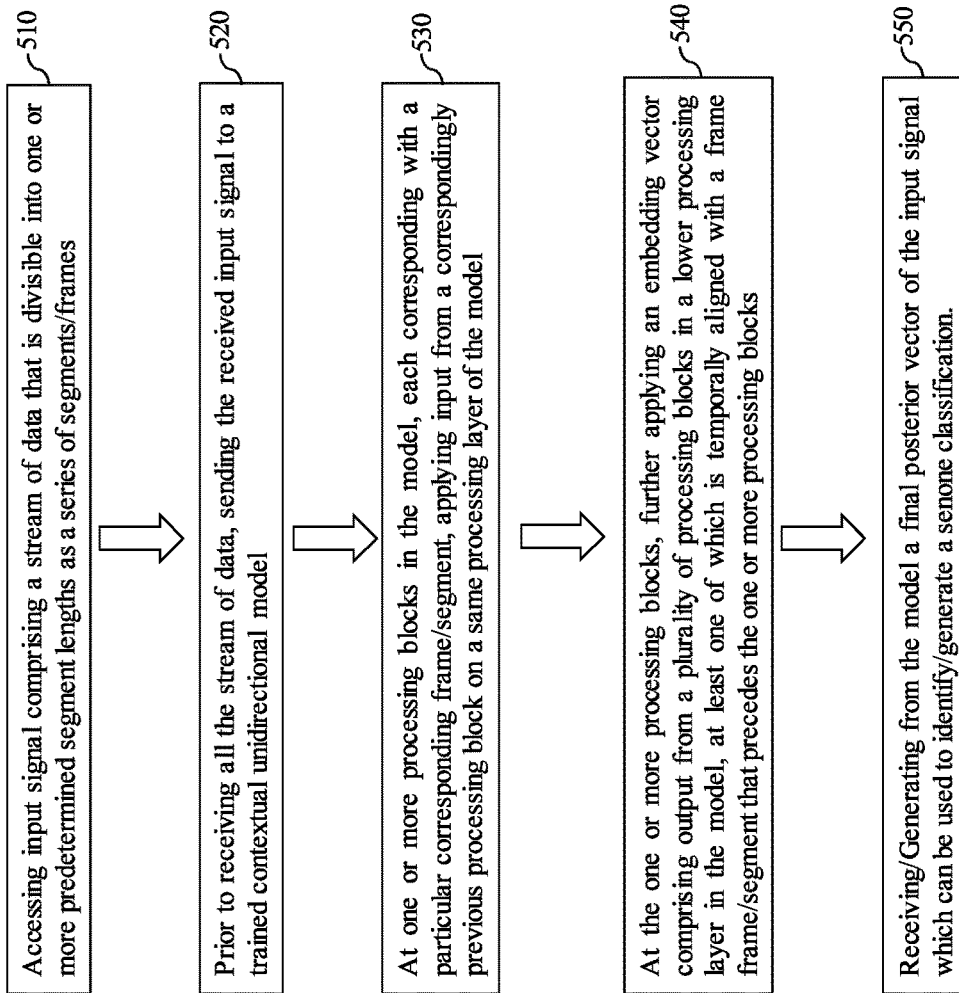
FIG. 5 illustrates a flowchart of acts associated with disclosed methods for processing a data stream with contextual unidirectional machine learning models.

FIG. 5 illustrates a flow chart 500 of acts associated with methods of the invention. As illustrated, the disclosed method may include an act of a computing system accessing an input signal comprising a stream of data that is divisible into one or more predetermined segment lengths as a series of segment frames (act 510). This signal can be speech, audio, handwritten data, text and/or other data.

The methods also comprise sending the receive input signals to a trained contextual unidirectional model, and prior to receiving all the stream of data (act 520). This may include parsing the received stream of data into discrete segments of predetermined lengths, as they are received. This may also include processing/transforming the signals into inputs for the corresponding processing blocks of the model that have a different/particular format than the format in which the signals were received. For instance, if the signals are a received as streaming analog audio, the system may first digitize the audio in discrete segments corresponding to particular/predetermined durations of time (e.g., 1, or more, or less seconds; or 10 or more or less milliseconds, or other durations). The segments may also be formed according to markers, e.g., pauses in a stream of audio, such that each segment is a variable length corresponding to a particular spoken word or utterance.

Once the input signals/frame segments are received in the processing model, they are applied corresponding processing blocks that are temporally aligned with the frame segments. They are, for instance, initially provided as input to processing blocks of an initial processing layer of the model. These processing blocks generate output that is passed up, from the initial layer to the next higher layer in the model. The blocks in the higher models continue to pass up their outputs to higher levels until it is finally presented as final output. Some blocks in the model also receive input from a preceding block in the same layer to generate the output, as is common for unidirectional models of various types.

In some instances, each of the processing blocks in the processing layers of the model (above the initial input layer) has at least two inputs that are applied by the processing blocks to generate its output that is passed up. The first, (for all but the first processing block) is the output of another processing block from a processing block that precedes the processing block on a same processing layer of the model corresponding (act 530).

The second input that is applied is an embedding vector (act 540). The embedding vector comprises output from a plurality of processing blocks in a lower processing layer in the model, at least one of which is temporally aligned with a frame segment that is temporally aligned with a frame segment that occurs/precedes the temporal alignment of the frame segment for the processing block that processes the embedding vector. The embedding vector applies a lookahead value to identify how many temporally offset blocks from the lower layer are to be applied. This lookahead value corresponds with the quantity of additional context to be considered and applied by each processing block that processes the embedding vector.

The processing blocks apply one or more algorithms to generate output associated with a predicted value associated with the input (e.g., input signals from the data stream in the segment to which the processing blocks apply). In some instances, the predicted value is a weighted value or a plurality of weighted values associated with probabilities in which certain terms/words/letters match the input signals of the segment(s) of the stream to which they correspond.

Finally, after the inputs/outputs are all processed by the model, to the point of generating an output for a particular output processing block in the final layer, then that output is provided as a final posterior vector to generate a senone classification of the input signal that corresponds to the input frame segment that is specifically associated with the output segment/block (act 550).

In some instances, there is an offset of the output processing block and the corresponding segment of the input signal, as described. This offset is a function of the embedding vector and a quantity of processing layers in the model.

It will be appreciated that the systems, methods, or devices described in the embodiments herein may be applied in various types of machine learning models and are not limited to the LSTM-RNN networks describe above. Further the embodiments described could also be applied to bidirectional models. Further, while the embodiments are described in view of a contextual LSTM processing blocks, the methods and concepts of this embodiment are not limited to a contextual LSTM block and may be applied to various types of processing blocks.

For example, some embodiments may be applied to a layer trajectory LSTM (ltLSTM) machine learning model. In this type of machine learning model, a standard LSTM-RNN manages the temporal modeling. While, in each frame segment, an independent, non-recurrent, series of depth LSTM processing blocks scan each of the hidden layers and apply the (i) outputs of the lower depth LSTM and (ii) the output of the temporal LSTM from the same layer and temporally aligned with the particular depth LSTM. For example, the depth-LSTM provides a direct connection with the input data and the final output data, while intaking information from each layer. One of the inputs to each depth LSTM block could be replaced with an embedding vector as described herein, which utilizes outputs from processing blocks which are associated with future frames. The embedding vector could be composed of depth LSTM outputs on a lower layer, or temporal LSTM outputs from a lower layer, or a combination of both.

In some embodiments of the invention is the capability to selectively apply the methods, systems, or devices described herein. For example, the system may be configured to dynamically apply the streaming contextual unidirectional model, by switching from another speech recognition model, only in response to detecting a triggering event. That triggering event could be the detection of an input that indicates that the streaming contextual unidirectional model should be applied, or a determination that a speech recognition function is to be applied to data that is streaming data or data of a particular format, or only when projected model output from the other speech recognition model falls below a desired/predetermined confidence of accuracy threshold (e.g., 20%, 10%, 5%, or another percentage), or any other criteria. In this manner, the system, device, or method would alternate between processing a standard unidirectional model and processing the streaming contextual unidirectional model depending on the criteria set by the user.

Example System(s)

Figure 6:
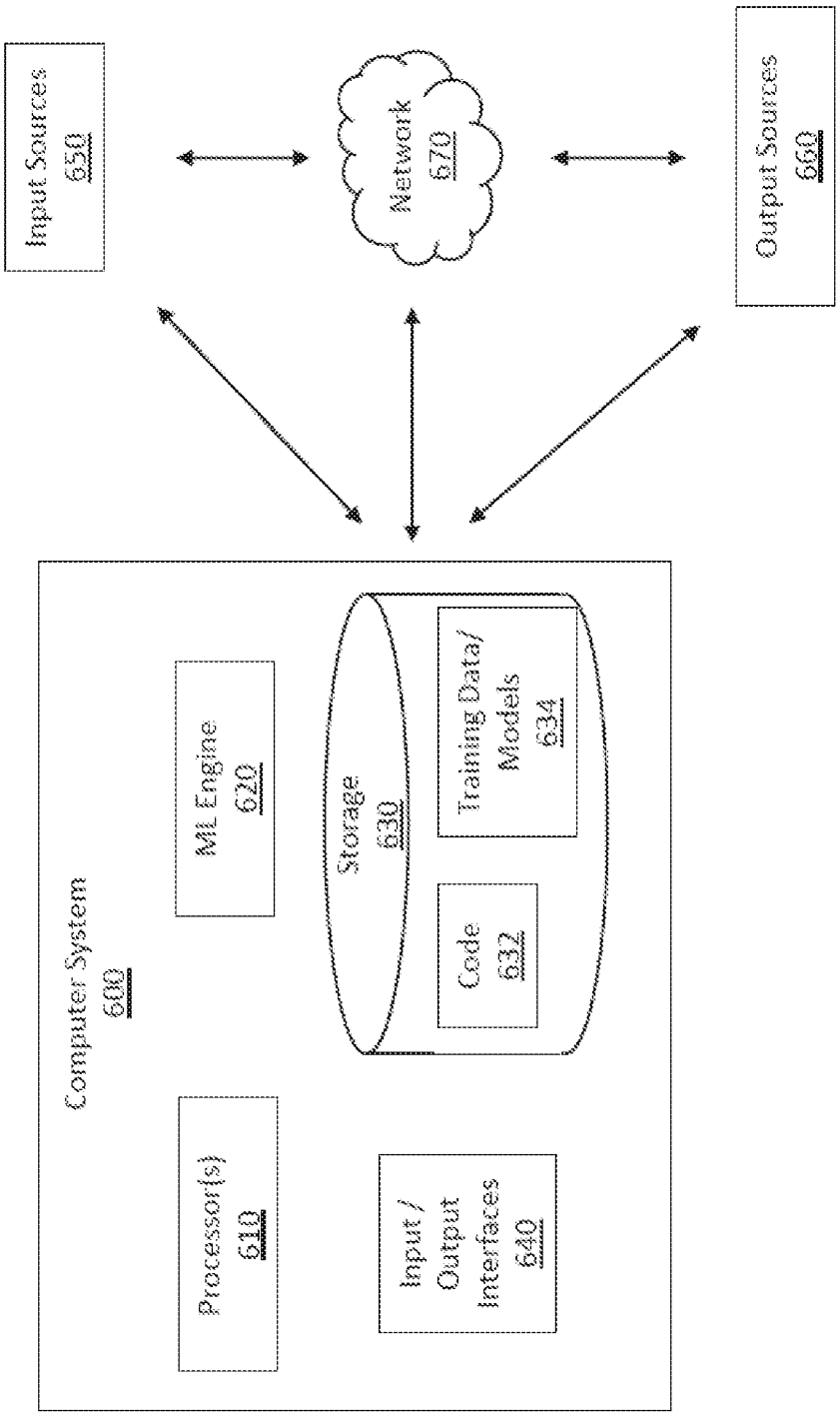
FIG. 6 illustrates a computing system which comprises and/or that may be incorporated into or be used to implement the disclosed and claimed embodiments.

Attention will now be directed to FIG. 6 which illustrates an example computer system 600 that may be used to facilitate the operations described herein. Computer system 600 may take various different forms. For example, in FIG. 6, computer system 600 may be embodied as a tablet, a desktop, a distributed system that includes one or more connected computing components/devices that are in communication with computer system 600, a laptop computer, a mobile phone, a server, a data center, and/or any other computer system.

In its most basic configuration, computer system 600 includes various different components. For example, FIG. 6 shows that computer system 600 includes at least one processor 610 (aka a "hardware processing unit"), a machine learning ("ML") engine 620, storage 630 that includes one or more storage device(s), and one or more input and output interfaces 640, which can include hardware and software interfaces.

The ML engine 620 may be used to perform any of the machine learning processes described herein. Furthermore, the ML engine 620 may include any type and/or combination of machine learning algorithm(s) or device(s), including one or more multilayer neural network(s), recursive neural network(s), deep neural network(s), decision tree model(s) (e.g., decision trees, random forests, and gradient boosted trees), linear regression model(s), logistic regression model(s), support vector machine(s) ("SVM"), artificial intelligence device(s), and/or any other type of intelligent computing system that utilizes and incorporates the embedding vectors or other equivalent structures for facilitating the functionality described herein. In some instances, the ML engine 620 is used with the interfaces 640 to generate the machine learning models discussed herein and to receive user input provided at the interfaces 640 for identifying a value for the lookahead value used by the embedding vectors and or a duration of time, or an identifier, to use for segmenting the data into discrete segments.

Although not shown, computer system 600 may be connected (via a wired or wireless connection of the network 670) to external sensors (e.g., one or more remote cameras, microphones, acoustic sensors, magnetometers, data acquisition systems, etc.) to receive and detect the data that is processed by the machine learning models and which may be stored in storage 630 in one or more formats.

The storage 630 may also store computer-executable instructions in the form of code 632, which is executed by the processor(s) 610 to implement the disclosed functionality. The storage 630 also stores the machine learning models (including the definitions and equations, particularly including the embedding vector definitions) and/or training data 634 for training the models. The storage 630 may also store software interfaces, such as interfaces 640, for facilitating communication between the different computer components and for receiving input and providing output to the different input source(s) 650 of the data that is processed and the different output source(s) 660 the receive the output of the processed data.

Storage 630 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

As used herein, the term "executable module," "executable component," "engine," "model," or even "component" can refer to software objects, routines, or methods that may be executed on computer system 600. The different components, models, modules, engines, and services described herein may be implemented as objects or processors that execute on computer system 600 (e.g. as separate threads). It will be appreciated that engines, modules, models, or components may be a combination of one or more processors and executable instructions that cause the processor(s) to perform specialized functions, such as those described throughout this disclosure.

In other instances, the components, modules, models, or engines may simply be executable instructions that are executable by any type of processor. In yet other instances, the components, modules, models, or engines, may be in the form of ASICs or even system-on-chip ("SOC") devices specially configured to perform any individual operation or to perform multiple operations. In this regard, a component, module, model, or engine can be thought of as a hardware processing unit, a compilation of executable code, or combinations of the above that enable a computer system to perform specialized operations.

The disclosed embodiments may comprise or utilize a special-purpose or general-purpose computer including computer hardware, such as, for example, one or more processors (such as processor(s) 610) and system memory (such as storage 630), Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media of the storage 630 are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

It will be appreciated that computer-executable (or computer-interpretable) instructions stored on the storage 620 comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 705). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

What is claimed is:

1. A method for facilitating application of a unidirectional machine learning model to a stream of content, the method comprising:

identifying a stream of content;

identifying, based on a predetermined segment length, one or more frame segments of content in the stream and prior to receiving all frame segments in the stream;

accessing the unidirectional machine learning model that includes a plurality of processing layers, including an initial input layer, one or more hidden layers, and a final output layer, each processing layer in the one or more hidden layers including a plurality of processing blocks that are sequentially positioned within each layer to provide output to a subsequent processing block and to receive input from a preceding processing block according to processing rules of the unidirectional machine learning model, where each processing block in the initial input layer receives an initial input as a frame segment from the stream; and for at least one processing block in each hidden layer:
(i) applying output of a previous processing block within a same hidden layer as input to the at least one processing block, and
(ii) applying an embedding vector as additional input to the at least one processing block, wherein the embedding vector is generated based on output from a plurality of processing blocks in a lower processing layer that is hierarchically lower than the corresponding hidden layer.

2. The method in claim 1 wherein a frame segment length is a duration of time.

3. The method in claim 1 wherein the stream of content input is a spoken utterance.

4. The method in claim 1 wherein the output is a senone classification.

5. The method in claim 1 wherein the stream of content is an audio file.

6. The method in claim 1 wherein the stream of content is textual data.

7. The method in claim 1 wherein the stream of content is handwritten data.

8. The method in claim 1 wherein the plurality of processing blocks utilize a recurrent neural network (RNN).

9. The method in claim 8 wherein the processing blocks are long-short term memory (LSTM) blocks.

10. The method in claim 1 wherein the lower processing layer is a hidden layer between the initial input layer and the corresponding hidden layer.

11. The method in claim 1 wherein the plurality of processing blocks includes at least three processing blocks, including one processing block that is temporally offset from the at least one processing block by one frame segment length and one processing block that is offset from the at least one processing block by two frame segment lengths.

12. The method in claim 1 wherein the plurality of processing blocks includes at least four processing blocks, including at least one processing block that is temporally offset from the at least one processing block by at least two segment lengths and one processing block that is offset from the at least one processing block by at least three frame segment lengths.

13. A computer system for facilitating application of a unidirectional model to a stream of content, the computer system comprising:

One or more processor(s); and

One or more storage device having stored computer-executable instructions which are executable by the one or more processor(s) for configuring the computer system to:

identify a data stream;

identify, based on a predetermined segment length, one or more frame segments of content in the data stream and prior to receiving an entirety of the data stream;

access a unidirectional machine learning model that includes a plurality of processing layers, including an initial input layer and one or more hidden layers and a final output layer, each processing layer in the one or more hidden layers including a plurality of processing blocks that are sequentially positioned within each layer to provide output to a subsequent processing block and to receive input from a preceding processing block according to processing rules of the unidirectional machine learning model, where each processing block in the initial input layer receives an initial input as a frame segment from the data stream; and for at least one processing block in each hidden layer,
   (i) apply output of a previous processing block within the corresponding hidden layer as input to the at least one processing block, and
   (ii) apply an embedding vector as additional input to the at least one processing block, wherein the embedding vector is generated based on output from a plurality of processing blocks in a lower processing layer that is hierarchically lower than the corresponding hidden layer.

14. The computer system in claim 13, wherein a frame segment length is a duration of time and wherein the data stream comprises a spoken utterance.

15. The computer system in claim 13, wherein the output is a senone classification.

16. The computer system in claim 13, wherein the data stream comprises an audio file.

17. The computer system in claim 13, wherein the plurality of processing blocks utilize a recurrent neural network (RNN) and wherein the processing blocks are long-short term memory (LSTM) blocks.

18. The computer system in claim 13, wherein the lower processing layer is a hidden layer between the initial input layer of the unidirectional machine learning model and the corresponding hidden layer.

19. The computer system in claim 13, wherein the plurality of processing blocks includes at least three processing blocks, including one processing block that is temporally offset from the at least one processing block by one frame segment length and one processing block that is offset from the at least one processing block by two frame segment lengths.

20. The computer system in claim 13, wherein the plurality of processing blocks includes at least four processing blocks, including at least one processing block that is temporally offset from the at least one processing block by at least two segment lengths and one processing block that is offset from the at least one processing block by at least three frame segment lengths.

* * * * *

UNITED STATES PATENT AND TRADEMARK OFFICE
CERTIFICATE OF CORRECTION

PATENT NO. : 11,244,673 B2
APPLICATION NO. : 16/516849
DATED : February 8, 2022
INVENTOR(S) : Jinyu Li et al.

Page 1 of 1

It is certified that error appears in the above-identified patent and that said Letters Patent is hereby corrected as shown below:

On the Title Page

In Item (73), Assignee:
Line 1, change "MICROSOFT TECHNOLOGLY LICENSING, LLC" to --MICROSOFT TECHNOLOGY LICENSING, LLC--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*